United States Patent [19]

Kulik

[11] 4,314,977

[45] Feb. 9, 1982

[54] METHOD FOR REMOVING HYDROGEN SULFIDE AND NITRIC OXIDE FROM GASEOUS MIXTURES

[75] Inventor: Metro D. Kulik, Pittsburgh, Pa.

[73] Assignee: Conoco Inc., Stamford, Conn.

[21] Appl. No.: 153,354

[22] Filed: May 27, 1980

[51] Int. Cl.$^3$ .............................................. B01D 53/34
[52] U.S. Cl. ..................................... 423/235; 423/400; 423/573 G
[58] Field of Search ............... 423/235, 351, 539, 523, 423/573

[56] References Cited

U.S. PATENT DOCUMENTS

| 1,313,370 | 8/1919 | Datta | 423/573 |
| 3,095,275 | 6/1963 | Fierce et al. | 423/573 |
| 3,976,745 | 8/1976 | Nauajima | 423/239 |

OTHER PUBLICATIONS

Supp. to Mellor's Treat. on Iorg.. & Theoretical Chem. vol. VIII, John Wiley & Sons, NY 1968 p. 234.

Primary Examiner—G. O. Peters
Attorney, Agent, or Firm—F. Lindsey Scott; Dale Lovercheck; William A. Mikesell, Jr.

[57] ABSTRACT

A method for removing hydrogen sulfide and nitric oxide from gaseous mixtures by adjusting the mol ratio of hydrogen sulfide to nitric oxide to a value from about 0.5 to about 1.1 and thereafter mixing a free oxygen containing gas with the gaseous mixture to provide a quantity of oxygen greater than about 0.5 mols of oxygen per mol of nitric oxide in the gaseous mixture. Either hydrogen sulfide or nitric oxide may be removed substantially completely.

10 Claims, No Drawings

METHOD FOR REMOVING HYDROGEN SULFIDE AND NITRIC OXIDE FROM GASEOUS MIXTURES

This invention relates to a method for removing hydrogen sulfide and nitric oxide from a gaseous mixture.

This invention further relates to a method for removing hydrogen sulfide from a gaseous mixture.

This invention further relates to a method for removing nitric oxide from a gaseous mixture.

In recent years there has been increasing concern directed to the preservation of a clean environment especially in areas where heavy industry is present. In many instances the concern is directed to preventing the emission of materials such as hydrogen sulfide, sulfur oxides and nitric oxide into the atmosphere. One source of considerable quantities of nitric oxide is the combustion of fossil fuels for the production of power and the like. While the emission of nitric oxide has not been controlled rigorously in the past, requirements for the control of nitric oxide appear to be increasingly likely as the undesirable effects of nitric oxide in the atmosphere become more evident. As a result, a considerable amount of effort has been directed to the development of methods for the removal of nitric oxide from gaseous mixtures. Some such efforts are shown in the following U.S. patents, which were considered in the preparation of the present application.

U.S. Pat. No. 2,325,066—Marcotte
U.S. Pat. No. 2,752,224—Joris
U.S. Pat. No. 3,843,771—Urban
U.S. Pat. No. 3,920,421—Collins
U.S. Pat. No. 3,932,585—Moriguchi
U.S. Pat. No. 3,984,522—Saito
U.S. Pat. No. 3,992,508—Saitoh
U.S. Pat. No. 4,029,739—Senjo
U.S. Pat. No. 4,035,470—Senjo Further references considered by reference to their chemical abstracts in the preparation of the present Application are as follows:

J. Chem. Soc. 1928, 2631-43—Bagster—"The Reaction Between Nitrous Acid and Hydrogen Sulfide"

J. Phys. Chem. 33, 22-36(1929)—Pierce—"Reaction Between Nitric Oxide and Hydrogen Sulfide"

J. Phys. Chem. 35, 1721-34(1931)—Dunnicliff et al.—"The Interaction Between Nitric Oxide and Hydrogen Sulfide in the Presence of Water".

J. Chem. Soc. Japan 52, 215-21(1931)—Kinumaki et al.—"Velocity of Reaction Between Nitric Oxide and Hydrogen Sulfide".

Z. anorg. allgem. Chem. 238, 335-49(1938)—Kurtenacker et al.—"Reaction of Nitric Oxide upon Thiosulfate and Sulfide".

Zhur. Priklad. Khim. 31, 980-6(1958)—Korsh et al.—"Reaction of Nitric Oxide with Hydrogen Sulfide on Sulfide Catalysts".

Pakistan J. Sci. Ind. Research 1, No. 1, 17-25(1958)—Siddique et al.—"Oxidation of Sodium Sulfide with Nitroc Oxide".

It has now been found that hydrogen sulfide and nitric oxide may be removed from a gaseous mixture by a method consisting essentially of adjusting the amounts of hydrogen sulfide and nitric oxide in the gaseous mixture to a mol ratio $H_2S/NO$ from about 0.5 to about 1.1 and thereafter mixing a free oxygen containing gas with the mixture in an amount sufficient to convert the hydrogen sulfide to elemental sulfur and $SO_2$ and to convert the nitric oxide to nitrogen and $N_2O$. By variation of the ratio, $H_2S/NO$, either $H_2S$ or NO may be removed substantially completely from the gaseous mixture.

In the removal of $H_2S$ and NO from the gaseous mixture it is desirable to adjust the quantities of $H_2S$ and NO to amounts which are stoichiometrically equivalent. It has been found that when $H_2S$ and NO react in the presence of oxygen, a product mixture comprising $N_2O$, elemental sulfur, nitrogen and $SO_2$ is produced. While Applicant does not wish to be bound by any particular theory, it is believed that while possibly a wide range of reactions are occurring the two primary reactions involved are $$H_2S + 2NO \rightarrow N_2O + S^o + H_2O \tag{1}$$

$$2H_2S + 2NO + O_2 \rightarrow N_2 + S^o + SO_2 + 2H_2O \tag{2}$$

It will be observed that by these two reactions the nitric oxide, NO, is converted to $N_2O$ and $N_2$ which is not considered to be harmful gases when vented to the atmosphere. In any event the $N_2O$ is readily removed by scrubbing with an alkaline solution as known to the art. In other words, NO is the $NO_x$ compound which is most difficultly removed and the NO has been converted by the two equations above to harmless nitrogen or the readily removed $N_2O$. The elemental sulfur is of course readily recovered as a solid or as a liquid dependent upon the temperature at which the reactions are conducted. $SO_2$ is readily removable by a variety of means known to the art for treating stack gases produced by the combustion of fossil fuels. Clearly, it is difficult in many instances to stoichiometrically balance the $H_2S$ and NO and such is best accomplished by monitoring the effluent gas and adjusting the flow of $H_2S$ or NO as required to result in the emission of minimal quantities of either $H_2S$ or NO. In many embodiments the resulting gaseous mixture after separation of the elemental surfur will be passed to a conventional scrubbing system where the $SO_2$ will be removed. Desirably, the $H_2S$ and NO are present in the gaseous mixture as reacted in a mol ratio ($H_2S/NO$) from about 0.5 to about 1.1. The oxygen is suitably present in an amount greater than about 0.5 mol of oxygen per mol of NO in the gaseous mixture with oxygen concentrations from about 4.0 to about 8.0 mols of oxygen per mol of NO being desirable. Obviously the use of larger quantities of oxygen than required will result in the handling of larger quantities of gas and the like, accordingly, the amount of oxygen to be used is normally that amount which is just sufficient to accomplish the desired objective.

In the event that it is desirable to remove either NO or $H_2S$ per se from the gaseous mixture, the ratio ($H_2S/NO$ is changed to favor the removal of the desired constitutent. For instance, when NO is to be removed, $H_2S$ and a free oxygen containing gas are added to the gaseous mixture in an amount sufficient to convert at least a major portion of the NO to nitrogen and $N_2O$. Desirably, the $H_2S$ is added in an amount equal to at least about 0.5 mol of $H_2S$ per mol of NO present in the gaseous mixture with $H_2S/NO$ ratios from about 0.5 to about 1.1 being preferred. The oxygen is suitably present in an amount equal to at least about 0.5 mol of oxygen per mol of NO in the gaseous mixture with an oxygen concentration from about 4.0 to about 8.0 mols of oxygen per mol of NO being preferred.

In the practice of the present method, it is highly desirable that the contacting be accomplished in the presence of water and preferably in the presence of at least a minor quantity of liquid water. While desirable results have been accomplished in the absence of liquid water, and with no water addition in any form to the reaction mixture it is considered highly desirable that water be present.

When it is desired to remove $H_2S$ from the gaseous mixture; NO and a free oxygen containing gas are mixed with the $H_2S$ in an amount sufficient to convert the $H_2S$ to elemental sulfur and $SO_2$. Desirably the NO is added in an amount equal to at least about 1 mol of NO per mol of $H_2S$. The oxygen is desirably present in an amount equal to at least 0.5 mols of oxygen per mol of NO with a ratio from about 4 to about 8 being preferred.

In the practice of the present invention, it is desirable that the reaction be conducted at a temperature greater than about 120° C. so that the elemental sulfur produced can be recovered in molten form. The operating pressure is not critical and substantially any pressure can be used. It may be desirable in the event that higher temperatures are used to use sufficient pressure to maintain at least a portion of the water in a liquid phase.

Thus it is seen that by the practice of the present invention either $H_2S$, NO or both can be removed from a gaseous stream. Since the reactions of the present invention can be conducted in a vapor phase, the use of the method of the present invention can readily be incorporated into existing processes to treat gases containing $H_2S$, $NO_x$ or both. The process of the present invention results in the removal of the very difficultly removable nitric oxide from such gaseous mixtures. The reaction has been found to be very rapid even when relatively dilute concentrations of $H_2S$ and NO are present. It has further been found that the removal of NO can be accomplished to a very high degree. For instance removals in excess of 90 percent have been accomplished.

Having thus described the invention by reference to certain of its preferred embodiments it is pointed out that the embodiments described are illustrative rather than limiting in nature and that many variations and modifications are possible within the scope of the present invention. Such variations and modifications may appear obvious and desirable to those skilled in the art based upon a review of the foregoing description of preferred embodiments and the following example.

EXAMPLE

An apparatus consisting of a glass flask equipped to measure gas pressure and volume was used. The flask was equipped with a system for purging with nitrogen so that the reaction atmosphere in the flask was nitrogen. Water was used as the gas displacement medium. All of the tests shown in the Table below were conducted after the removal of air from the vessel by repeated nitrogen purges. After the flask had been purged and filled with nitrogen the desired amount of each reactant gas was separately injected into the flask in the following sequence: air, hydrogen sulfide, and NO. The gases were then mixed and the pressure adjusted to 1 atmosphere. After the specified time, the gaseous volume was recorded and a sample of the gas produced was withdrawn and analyzed by gas chromatography. Elemental sulfur was determined in Run 7 by weighing the flask before and after the test run after a similar drying process. The test results are as shown in Table 1 below. The test temperature was 25° C. for all tests and all tests were run at a pressure of 1 atmosphere.

It will be observed that in the tests shown the most desirable removal of NO occurred when oxygen was used in a ratio $O_2/NO$ greater than about 4. In two tests, tests 7 and 8, lower amounts of oxygen were used and relatively high NO removal rates were still accomplished. In one of the tests, ammonia, which has been observed to catalyze the reaction to some extent, was used. The results obtained in test 7 were not obtained by the use of ammonia, however, it is believed that the most desirable results are normally obtained when slightly greater amounts of oxygen are present. In test 7 it is believed that side reactions which are more likely at the higher reactant concentrations account for the high percentage of the NO removed. At lower reactant concentrations, lower conversions and less complete removals are achieved when the $O_2/NO$ ratio is low. Further, it will be noted that the product gas from test 7 still contained substantial quantities of NO. Accordingly, it is believed that desirable operation of the process will utilize oxygen in a ratio $O_2/NO$ greater than about 0.5 and preferably in a ratio of about 4 to about 8.

TABLE I

| | Run Number | | | | | | | |
|---|---|---|---|---|---|---|---|---|
| | 1 | 2 | 3 | 4 | 5 | 6 | 7 | 8 |
| Reaction Time, min. | 20 | 20 | 10 | 10 | 10 | 10 | 10 | 5 |
| Feed, mols $\times 10^{-4}$ | | | | | | | | |
| $H_2S$ | 4.00 | 4.00 | 1.00 | 8.00 | 1.00 | 1.00 | 20.00 | 20.00 |
| $O_2$ (1) | 4.12 | 12.92 | 8.20 | 12.92 | 8.20 | 8.20 | 8.20 | 8.20 |
| NO | 4.00 | 2.00 | 1.00 | 1.00 | 2.00 | 1.00 | 20.00 | 20.00 |
| $NH_3$ | 0.00 | 0.00 | 0.00 | 0.00 | 0.00 | 0.40 | 0.00 | 2.00 |
| $N_2$ (2) | 135.10 | 112.70 | 111.00 | 107.30 | 111.00 | 111.00 | 115.00 | 109.00 |
| Total | 147.22 | 131.62 | 121.20 | 129.22 | 122.20 | 121.60 | 163.20 | 159.20 |
| Product Gas, mols $\times 10^{-4}$ | | | | | | | | |
| $N_2$ (2) | 136.10 | 115.30 | 111.80 | 107.40 | 112.80 | 111.90 | 124.00 | 113.90 |
| $O_2$ | 0.00 | 10.67 | 7.66 | 12.06 | 6.61 | 7.65 | 0.25 | 0.02 |
| $H_2S$ | 0.42 | 0.00 | 0.12 | 6.07 | 0.00 | 0.12 | 3.80 | 0.00 |
| $SO_2$ | 1.68 | 1.37 | 0.28 | 0.29 | 0.04 | 0.01 | 1.18 | 0.02 |
| $N_2O$ | 0.07 | 0.26 | 0.12 | 0.11 | 0.12 | 0.00 | 1.84 | 1.45 |
| NO | 2.53 | 0.09 | 0.01 | 0.01 | 0.001 | <0.001 | 0.12 | 7.43 |
| Total | 140.80 | 127.69 | 119.99 | 125.94 | 119.571 | 119.681 | 131.19 | 122.82 |
| Other Products, mols $\times 10^{-4}$ | | | | | | | | |
| S° | | | | | | | 15.6 | |
| Nitrite | | | | | | | 0.0 | |
| Sulfate | | | | | | | 1.3 | |
| NO Conversion, % | 36.8 | 95.6 | 98.8 | 98.8 | 99+ | 100 | 99.4 | 64.0 |

TABLE I-continued

| | Run Number | | | | | | | |
|---|---|---|---|---|---|---|---|---|
| | 1 | 2 | 3 | 4 | 5 | 6 | 7 | 8 |
| N Balance, mols × $10^{-4}$ | | | | | | | | |
| $N_2$, in | 137.1 | 113.7 | 111.5 | 107.8 | 112.0 | 111.5 | 125.0 | 119.0 |
| $N_2$, out | 137.4 | 115.7 | 111.9 | 107.5 | 113.0 | 111.9 | 125.9 | 119.1 |
| Ratios | | | | | | | | |
| $H_2S$/NO | 1.0 | 2.0 | 1.0 | 8.0 | 0.5 | 1.0 | 1.0 | 1.0 |
| $O_2$/NO | 1.03 | 6.45 | 8.20 | 12.92 | 4.10 | 8.20 | 0.41 | 0.41 |

(1) Added as air.
(2) Includes Argon and $CO_2$ but not $NH_3$.

Having thus described the invention, I claim:

1. A method for removing $H_2S$ and NO from a gaseous mixture, said method comprising essentially of
   (a) adjusting the amounts of $H_2S$ and NO in said gaseous mixture to a ratio $H_2S$/NO from about 0.5 to about 1.1
   (b) admixing a free-oxygen containing gas with said mixture in an amount sufficient to convert said $H_2S$ to elemental sulfur and $SO_2$ and to convert said NO to nitrogen and $N_2O$.

2. The method of claim 1 wherein said oxygen is added in an amount greater than about 0.5 mols per mol of NO in said gaseous mixture.

3. The method of claim 2 wherein said oxygen is added in an amount equal to from about 4.0 to about 8.0 mols per mol of NO in said gaseous mixture.

4. A method for removing NO from a gaseous mixture; said method consisting essentially of adding $H_2S$ and a free oxygen containing gas to said gaseous mixture in an amount sufficient to convert at least a major portion of said NO to nitrogen and $N_2O$.

5. The method of claim 4 wherein said $H_2S$ is added in an amount equal to at least about 0.5 mols per mol of NO present in said gaseous mixture.

6. The method of claim 4 wherein said $H_2S$ is added in an amount equal to from about 0.5 to about 1.1 mols per mol of NO present in said gaseous mixture.

7. The method of claim 4 wherein said oxygen is added in an amount equal to at least about 0.5 mols per mol of NO present in said gaseous mixture.

8. The method of claim 4 wherein said oxygen is added in an amount equal to from about 4.0 to about 8.0 mols per mol of NO present in said gaseous mixture.

9. The method of claim 4 wherein said NO, said $H_2S$ and said oxygen are contacted in the presence of water.

10. The method of claim 4 wherein said $H_2S$, said $O_2$ and said NO react to produce elemental sulfur and nitrogen.

* * * * *